Figure 1:
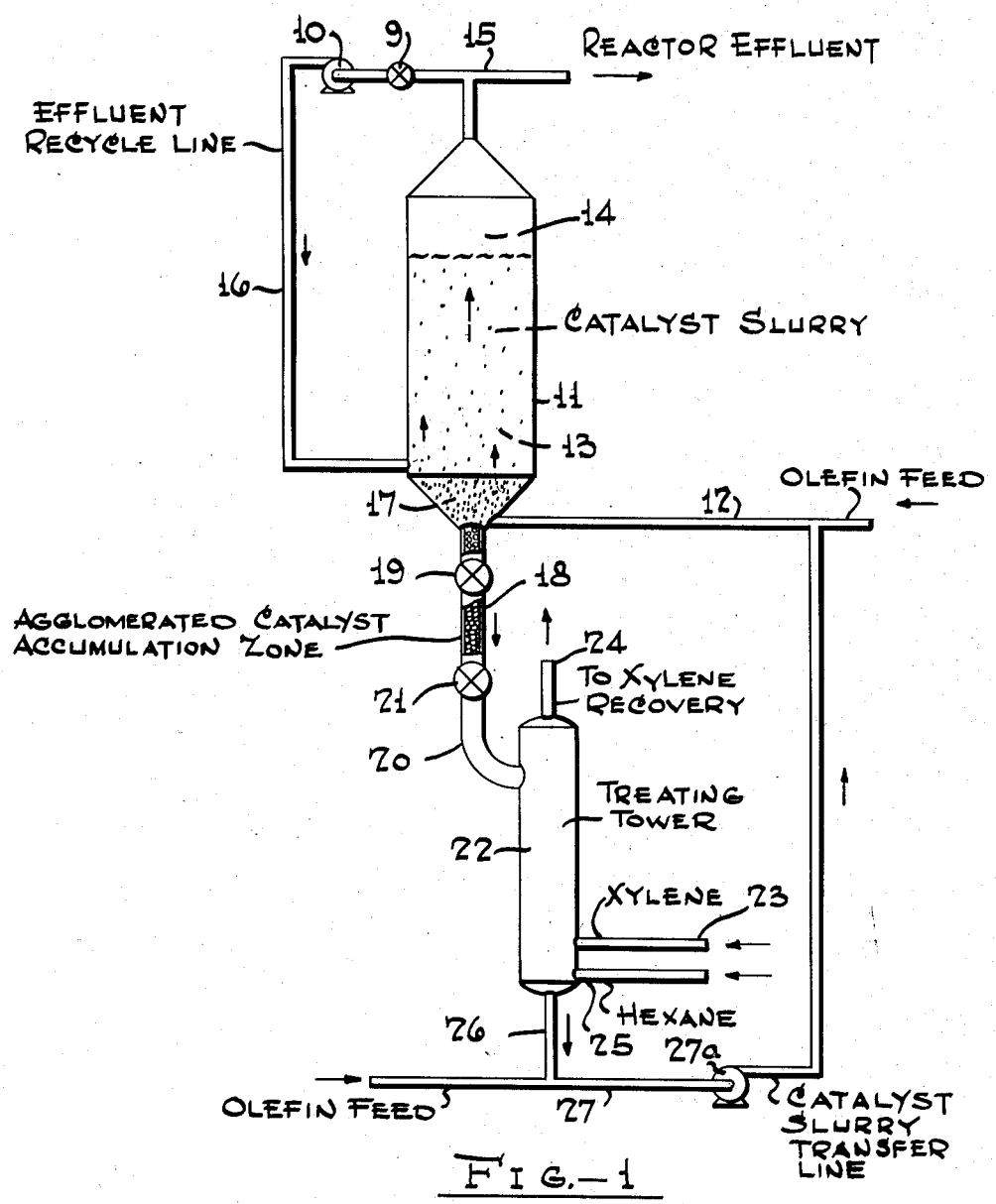

Patented Nov. 10, 1953

2,658,933

UNITED STATES PATENT OFFICE 2,658,933

SLURRY POLYMERIZATION PROCESS

Walter G. May, Roselle, and George L. Matheson, Summit, N. J., assignors to Standard Oil Development Company, a corporation of Delaware Application August 17, 1951, Serial No. 242,208

11 Claims. (Cl. 260—683.15)

This invention is concerned with the polymerization of low molecular weight olefins to produce low molecular weight polymers boiling in the gasoline boiling range employing a finely-divided, solid phosphoric acid catalyst maintained as an agitated suspension or slurry in a fluid hydrocarbon phase. The invention is particularly concerned with a method of recovering and revivifying agglomerated catalyst that forms during the polymerization process.

It is known to polymerize normally gaseous olefins such as $C_2$—$C_5$ olefins by contacting them with an agitated slurry or suspension of finely-divided, solid phosphoric acid catalyst in a highly dense, fluid hydrocarbon phase. The process has a number of advantages over conventional fixed-bed or low pressure fluidized catalyst operations from standpoints such as heat control maintenance, improved polymer yield, catalyst replacement and the like.

However, one disadvantage encountered in the slurry-type operation is that certain solid phosphoric acid catalysts tend to agglomerate into lumps or cake after extended operation periods. Apparently the catalyst adsorbs high molecular weight bodies of different types which cause the particles to cohere. The cohering particles are difficult to maintain in suspension and are substantially inactive. There are at least two different types of catalyst agglomerates. The first type comprises light-colored balls, putty-like in appearance, having particle sizes up to about 2 inches in diameter. Another distinct type comprises dark-colored agglomerates of individual particles coated with carbonaceous materials. The agglomerates, in addition to being substantially inactive with respect to polymerization activity, cause mechanical difficulties such as breaking the blades of mechanical agitators employed to maintain the catalyst suspension and the like.

It has been proposed to prevent catalyst agglomeration by co-suspending with the catalyst a finely divided, solid adsorbent which has substantially the same settling characteristics as the catalyst and which is substantially inactive in the polymerization step. Such solid diluents include silica gel, activated carbon, alumina and the like. The use of such adsorbents leads to decreased utilization of reactor space and, in some cases, the diluent adsorbs phosphoric acid from the catalyst and gradually deactivates it.

It has been proposed in patent application Serial No. 208,507, filed June 30, 1951, in the name of Sumner B. Sweetser, that agglomeration be prevented by washing the catalyst continuously or intermittently with an aromatic solvent or the like, to remove high molecular weight materials from the catalyst before it agglomerates. This procedure is disadvantageous from the standpoint that much of the catalyst which is still active must be washed with a solvent. On the other hand, it is not feasible to include an aromatic solvent or the like along with the reactants in the reaction zone to prevent agglomeration since such materials enter into the reaction and produce undesirable side products.

It is the object of the present invention to disclose a means for removing catalyst which is agglomerated from the reaction zone, washing only the agglomerated catalyst with a suitable solvent whereby the catalyst is deglomerated and reactivated, and returning the activated catalyst to the reaction zone. The term "deglomerated" as used herein refers to separation or breaking down of the agglomerated mass into particles of substantially the same size as the catalyst particles that cohered.

The polymerization reaction is conducted in such manner that unagglomerated catalyst is maintained in slurry form by suitable agitation or fluidization means. As the catalyst agglomerates, it is settled or otherwise removed from the main body of slurried catalyst and is subjected to a treating operation as hereinafter described. This procedure provides a means of treating only a limited portion of the catalyst and permits maintenance of catalyst activity at a relatively high level by a rather simple expedient.

The slurry polymerization of normally gaseous olefins is usually carried out in a single zone, or in multiple zones in series or parallel operation, which are maintained at temperatures in the range of about 350° to 600° F. and at pressures above about 450 p. s. i. g. The catalyst is maintained as a dense slurry in a fluid hydrocarbon phase comprising olefins, paraffinic diluents and polymer. It is agitated by mechanical agitation, or by flowing olefin feed and/or recycled reactor effluent up through the catalyst mass, or by other substantially equivalent means. The reaction zone may be of the hindered settler type wherein a dense catalyst phase exists in the lower portion thereof, and a hydrocarbon phase is superimposed above it from which a reactor effluent substantially free of catalyst is withdrawn.

The fluid hydrocarbon phase in which the catalyst is suspended is highly dense and may be a liquid phase, a highly dense vapor phase at high pressures, or a critical phase at pressures above the critical for the hydrocarbons therein. The operation may be conducted at temperature and pressure conditions wherein two phases, both liquid and vapor, co-exist in the reaction zone. Catalyst is suspended in the liquid phase and the co-existing vapor phase is superimposed above the liquid. Reaction zone effluents are withdrawn simultaneously from both the liquid and vapor phases, both of these effluents containing polymer product. Either phase may be recycled in whole or in part to the liquid phase for fluidization purposes.

The solid phosphoric acid catalyst used in the practice of the present invention usually comprises about 50 to 90 weight per cent phosphoric acid, based on the total weight of the catalyst, deposited on or impregnated in a solid adsorbent carrier. The invention particularly applies to solid phosphoric acid catalysts which tend to agglomerate when suspended in a dense hydrocarbon phase under polymerization conditions of temperature and pressure. In particular it has been found that catalysts having siliceous bases, such as silica gel, kieselguhr, diatomaceous earth and the like, tend to agglomerate. The agglomeration is particularly noticeable when such catalysts are used with a low molecular weight olefin such as propylene. The finely divided catalysts of the present invention refer to those having particle sizes in the range of about 20 to 200 mesh or smaller.

The agglomerated catalyst may be removed from the main body of the catalyst by one of several procedures. In hindered settler polymerization operations, feed and/or recycled effluent are charged upwardly through the catalyst mass to keep it in suspension. It is preferred that the fluidization velocity through the catalyst be somewhat above the fluidization velocity required to keep the largest unagglomerated catalyst particles in suspension, but below the fluidization velocity required to suspend the smallest agglomerated catalyst masses which form. This permits maintaining the unagglomerated catalyst in suspension, and agitating the contents of the zone whereby good mixing is achieved such that the olefins are thoroughly contacted with the catalyst. As the catalyst agglomerates, however, it will reach a size at which its minimum fluidization velocity exceeds the fluidizing velocity actually used in the zone. It will then settle to the bottom of the zone for removal therefrom in accordance with the practice of the present invention.

In mechanically-stirred reaction zones, where the suspension of catalyst is independent of fluidization velocities, catalyst agglomerates of such size will form that will eventually settle to the bottom of the reactor, agitation by mechanical means being insufficient to maintain them in suspension. The agglomerates may then be removed and treated. Since the agglomerates sometimes cake on the blades of mechanical stirring devices, or cause other mechanical difficulties, it is generally preferred to pass continuously the dense catalyst slurry from the mechanically agitated zone to a hindered settling zone, wherein substantially all of the agglomeration occurs and in which the agglomerated catalyst is settled from the main body of the catalyst for treatment.

The agglomerated catalyst removed from the substantially unagglomerated catalyst, by one of the above or other equivalent means, is then washed with a liquid having good solvent properties for the high molecular weight materials binding the catalyst particles together. Solvents that comprise relatively low boiling aromatic hydrocarbons are generally preferred; however, other compounds having equivalent solvent properties or fractions rich in low molecular weight aromatic constituents may be employed. In general, aromatic solvents are selected from those having a single aromatic ring. It is preferred that alkyl aromatic solvents such as, for example, xylene be used. It is also preferred that the alkyl group have no more than two carbon atoms in the chain. While the preferred solvent comprises xylene, other aromatic solvents such as benzene, toluene, ethyl benzene, mesitylene or the like, or their mixtures may be employed.

Figure 2:
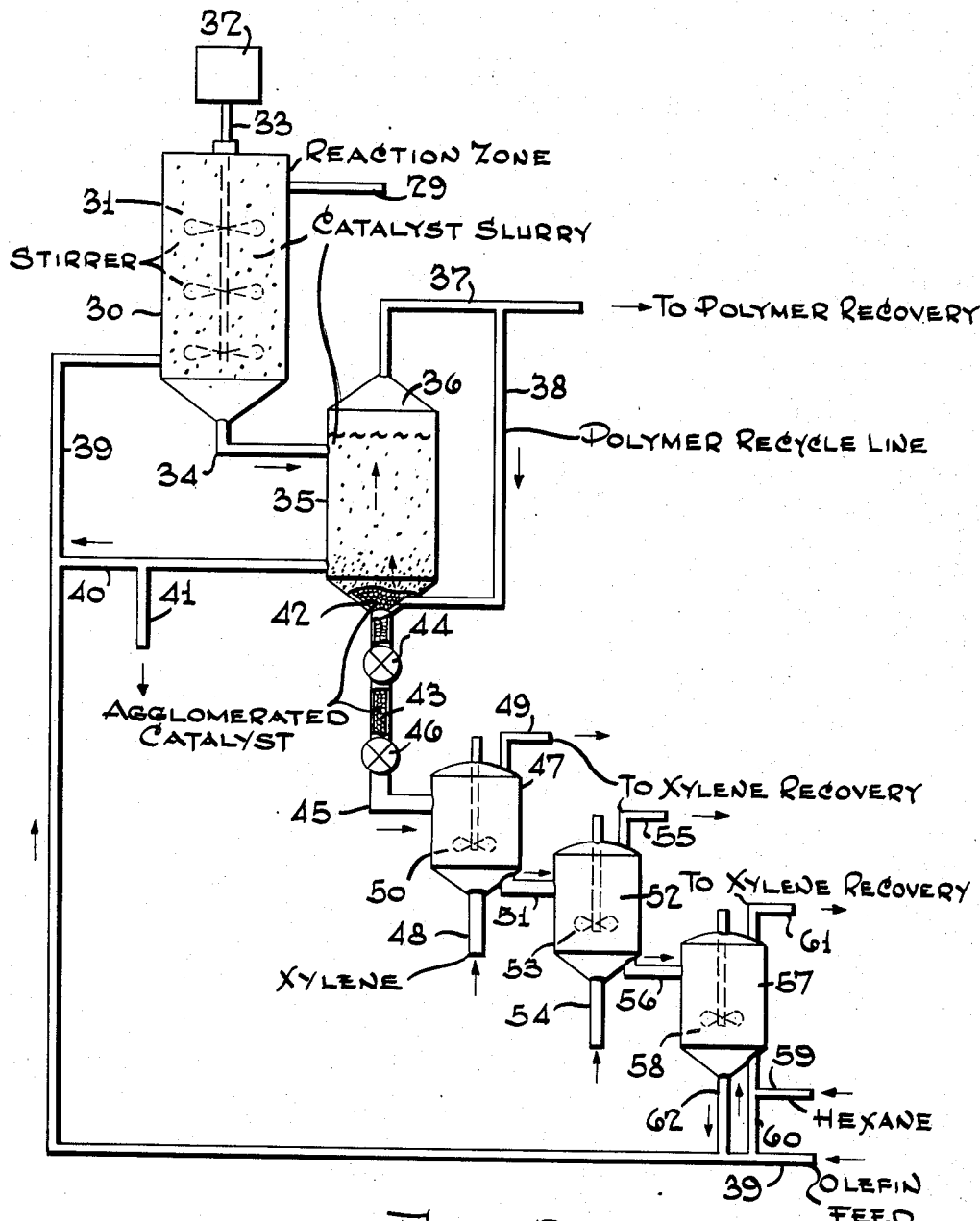

The invention will be illustrated in connection with the accompanying figures in which:

Figure 1 illustrates a hindered settler polymerization zone and washing zone; and Figure 2 illustrates an operation in which the catalyst is removed from a mechanically agitated zone into a settling zone, from which agglomerated particles are removed and washed in a multiple batch system.

Referring to Figure 1, the numeral 11 designates a hindered settler reaction zone in which a finely divided catalyst, such as phosphoric acid deposited on silica gel and having a particle size in the range of about 60–100 mesh, is suspended in a single hydrocarbon phase at a pressure of about 1000 p. s. i. g. An olefin feed comprising about 50% $C_3$—$C_4$ olefins is introduced into the lower portion of zone 11 by means of line 12 and passes upwardly through the hydrocarbon phase at a fluidizing velocity such as in the range of 2 to 6 feet/minute sufficient to keep the agitated catalyst particles in suspension in the lower portion 13 of zone 11. A clearly defined interface exists between the catalyst slurry suspended in the upflowing hydrocarbon stream, zone 13, and the clear hydrocarbon zone above containing no catalyst, zone 14. Substantially catalyst-free effluent comprising polymer is withdrawn through line 15. Zone 11 is maintained at a temperature of about 450° F., under which conditions substantial proportions such as 75 to 90% of the olefins are converted to dimers and trimers boiling in the gasoline boiling range. If desired, a portion of the reactor effluent may be recycled through line 16 containing valve 9 and pump 10 to the lower portion of zone 11 in order to help maintain the catalyst in suspension.

As the reaction proceeds, the catalyst particles will gradually become coated with high molecular weight polymers or carbonaceous materials, and the particles will cohere into agglomerates having a fluidization velocity greater than that maintained in the reaction zone. The agglomerates will settle into the lower conical portion 17 of zone 11. From time to time the agglomerates may be withdrawn from zone 17 into accumulation zone 18 by proper control of valve 19, and the agglomerates may then be transferred through line 20 having valve 21 into the top of treating tower 22. A stream of aromatic solvent such as, for example, xylene, is introduced at the bottom of treating tower 22 by means of line 23. The settling agglomerated catalyst is countercurrently washed by the stream of xylene flowing upwardly through the tower. A hydrocarbon mixture comprising xylene, the small amount of hydrocarbons in which the catalyst was suspended, and the materials dissolved from the catalyst is withdrawn from the top of tower 22 through line 24. This mixture is sent to a recovery system, not shown, for separation of xylene from contaminating materials by distillation or other means, and the substantially purified xylene is recycled to tower 22 by means of line 23.

The catalyst agglomerates which pass downwardly through tower 22 in contact with the solvent are gradually broken up into revivified particles having substantially the original size of the catalyst in the reaction zone by dissolving adsorbed materials therefrom. The catalyst particles settling to the bottom of tower 22 may then be washed with a paraffinic solvent, such as hexane, which is introduced by means of line 25. Thus the catalyst which is substantially free of polymerized or other high molecular weight bodies is also washed substantially free of xylene before being recycled to the reaction zone.

A slurry of the catalyst is then withdrawn from the bottom of tower 22 by means of line 26 and is preferably mixed with at least a portion of the fresh olefin feed passing through line 27. The suspension is passed through line 27 containing pump 27a, to line 12 and thence to the reaction zone. In this manner the revivified and deglomerated catalyst is continuously or intermittently introduced into the main body of the suspended catalyst in zone 11.

Referring to Figure 2, catalyst is maintained as a dense suspension in fluid hydrocarbon comprising olefin feed in zone 30. The contents are thoroughly agitated by means of stirrer 31 actuated by prime mover 32 through shaft 33. The slurry of catalyst and hydrocarbon is continuously withdrawn from zone 30 through line 34 and is passed into the upper portion of hindered settling zone 35. A dense catalyst slurry is maintained in the lower portion of zone 35 and a clear hydrocarbon phase, containing substantially no catalyst in the upper portion, zone 36. Effluent is withdrawn from phase 36 through line 37, and a portion of the effluent is recycled through branch line 38 into the lower portion of the dense catalyst phase in zone 35. Olefin-containing feed is introduced into the lower portion of zone 30 through line 39. A portion of the dense catalyst phase may be continuously passed from zone 35 through line 40 and line 39 into zone 30. If desired, a portion of the catalyst slurry may be withdrawn from the system through line 41 and replaced by fresh active catalyst introduced into zone 30 through line 29 as a slurry in a hydrocarbon or the like.

Reaction conditions are conducted such that a portion of the olefin polymerization occurs in zone 30. However, substantial polymerization as well as most of the catalyst agglomeration occurs in zone 35. Catalyst agglomerates settle into the lower conical portion 42 of zone 35, and may be removed from the system into accumulation zone 43 through valve 44.

Agglomerated catalyst is then passed through line 45 by controlling valve 46 and is charged into initial treating zone 47. A primary solvent, such as xylene, is fed into the bottom of the initial or primary treating zone 47 by means of line 48 and is withdrawn from the top of this zone through line 49. A stirrer 50 is provided to maintain intimate contact between the agglomerated catalyst and xylene. A slurry containing partially deglomerated catalyst is withdrawn by means of line 51 and is introduced into a secondary treating zone 52 containing stirrer 53.

Xylene is introduced into zone 52 through line 54 and is withdrawn by means of line 55. The catalyst is further washed and contacted with the xylene in this zone and is then withdrawn through line 56 and introduced into a tertiary zone 57. This zone is agitated by stirrer 58, and a secondary solvent such as normal hexane is introduced therein by means of line 59. In this modification, a portion of olefin feed may be passed from line 39 through line 60 with or without the hexane solvent to wash the catalyst completely free of xylene. The aromatic and non-aromatic solvents are withdrawn from zone 57 through line 61 and are sent to a suitable recovery system, not shown. Deglomerated catalyst, washed substantially free of high molecular weight bodies and aromatic solvent, passes through line 62 and is mixed with olefin feed in line 39, through which it passes to zone 30. Suitable control valves may be provided in all the lines where they are not shown explicitly.

While two systems have been described for removing and treating agglomerated catalyst particles, it will be obvious to persons skilled in the art that other equivalent separation and treating procedures may be used to accomplish the objects of the present invention. The solvent washing of the agglomerated catalyst may be carried out by using intermittent batch treatment in a single treating zone. In connection with Figure 2, for example, treater 47 may be partly filled with the agglomerated catalyst and the treater then filled with aromatic solvent. After sufficient agitation such as, for example, several minutes, the bulk of the xylene may be withdrawn, leaving a slurry of partly deglomerated catalyst therein. A second charge of fresh xylene may then be added to the zone for further washing and deglomeration of the catalyst. This process may be repeated as many times as necessary to deglomerate and revivify the catalyst. The catalyst may then be given a final washing with a non-aromatic primary solvent such as a paraffinic or olefinic stream to remove aromatic material before the catalyst is returned to the reaction zone for further use.

The agglomeration of catalyst will be relatively slow and frequently will not occur in appreciable amounts until after the reaction has proceeded from 50 to 100 hours or so; therefore, the capacity of the treating system will be relatively small in comparison to the reaction and/or settling zone capacities. The treating operation may be conducted at a pressure and temperature substantially the same as that employed in the reaction zone. Frequently, it will be desired to carry out the washing step at about 75° to 125° F. below the polymerization temperature. A preferred treating temperature is in the range of about 300° to 350° F. In separating agglomerated catalyst from unagglomerated catalyst in a hindered settler-type zone, it will generally be necessary to maintain fluidization velocities up through the zone in the range of about 1 to 10 feet per minute at the pressures used in the reaction zone. Preferably, the fluidization velocities will be above about 0.6 feet per minute, particularly when the pressures are maintained above the critical for the hydrocarbon contents of the zones, that is above about 900 to 1000 p. s. i. g. Such fluidization velocities permit maintenance of the unagglomerated catalyst particles in agitated suspension and yet permit the agglomerated particles to settle in the manner heretofore described. By careful control of the fluidization velocity, agglomeration of catalyst into large masses may be prevented since agglomerates having sizes of only several times the size of the larger catalyst particles will settle before large masses may be formed.

What is claimed is:

1. In the process of polymerizing olefins to produce low boiling polymers in which a solid, finely divided phosphoric acid catalyst is maintained as an agitated suspension in a fluid hydrocarbon phase comprising said olefins and in which at least a portion of said catalyst agglomerates by the binding action of high molecular weight materials adsorbed thereon, the improvement which comprises removing said agglomerated catalyst from said suspension, washing it with a liquid solvent whereby it is deglomerated and returning the deglomerated catalyst to said suspension, said solvent having good solvent properties for said high molecular weight binding materials.

2. A process in accordance with claim 1 in which said catalyst comprises phosphoric acid deposited on a siliceous carrier.

3. A process in accordance with claim 1 wherein said agglomerated catalyst is washed with an aromatic hydrocarbon solvent.

4. A process in accordance with claim 3 in which said solvent comprises xylene.

5. In the process of polymerizing normally gaseous olefins in a reaction zone in which a finely divided, solid phosphoric acid catalyst is maintained as a slurry in a fluid hydrocarbon phase under polymerization pressure and temperature conditions and in which at least a portion of said catalylst coheres into substantially inactive agglomerates difficult to maintain in slurried condition, the improvement which comprises settling and removing agglomerated catalyst from said slurry, washing said agglomerated catalyst with an aromatic hydrocarbon solvent whereby it is deglomerated and substantially reactivated, removing solvent from the deglomerated catalyst, and returning the deglomerated catalyst to said slurry.

6. A process in accordance with claim 5 in which said pressure is above about 450 p. s. i. g. and said temperature is in the range of about 350° to 600° F.

7. A process in accordance with claim 5 in which said catalyst is maintained in slurried condition by passing a stream comprising hydrocarbons upwardly therethrough at a velocity sufficient to maintain unagglomerated catalyst suspended and insufficient to maintain said agglomerated catalyst suspended.

8. A process in accordance with claim 7 in which said hydrocarbon is passed upwardly through said catalyst at a velocity in the range of about 1 to 10 feet per minute.

9. A process in accordance with claim 5 wherein said agglomerated catalyst is withdrawn from said slurry and is introduced into the top of a treating zone and countercurrently contacted by means of said solvent which is introduced into the bottom of said treating zone.

10. In the process of polymerizing normally gaseous olefins to produce polymers boiling in the gasoline boiling range in which a catalyst comprising phosphoric acid deposited on a siliceous base and having a size in the range of about 20 to 200 mesh is maintained as an agitated suspension in a hydrocarbon phase, and in which said catalyst particles agglomerate and become substantially inactive after prolonged contact due to the adsorption of high molecular weight bodies thereon, the improvement which comprises settling agglomerated catalyst particles from the suspended catalyst, passing the agglomerated catalyst into a primary recovery zone wherein a primary aromatic hydrocarbon solvent is used to wash said high molecular weight material from said catalyst to cause deglomeration thereof, withdrawing and introducing the catalyst into a secondary recovery zone wherein it is treated with a second portion of said primary solvent, withdrawing the washed catalyst and introducing it into a tertiary treating zone for treatment with a secondary paraffinic hydrocarbon solvent in order to remove said primary solvent from said catalyst, and withdrawing deglomerated catalyst from said tertiary zone and passing same to said reaction zone.

11. Process according to claim 5 wherein said agglomerated catalyst is continuously withdrawn, deglomerated and returned.

WALTER G. MAY.
GEORGE L. MATHESON.

References Cited in the file of this patent
UNITED STATES PATENTS

| Number | Name | Date |
|---|---|---|
| 2,234,177 | Kanhofer | Mar. 11, 1941 |
| 2,515,062 | Smith | July 11, 1950 |